G. F. Wilson.
Phosphates for Agricultural Purposes.
Nº 75327. Patented Mar. 10, 1868.
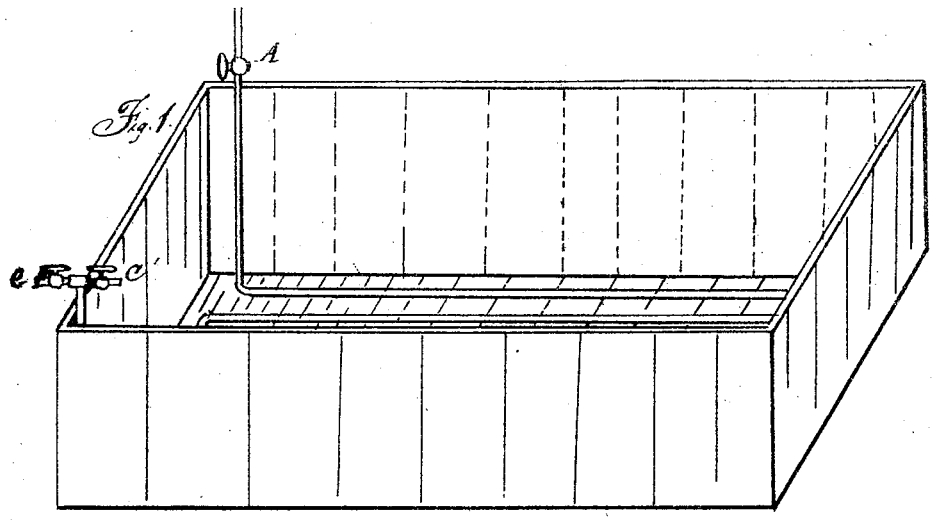
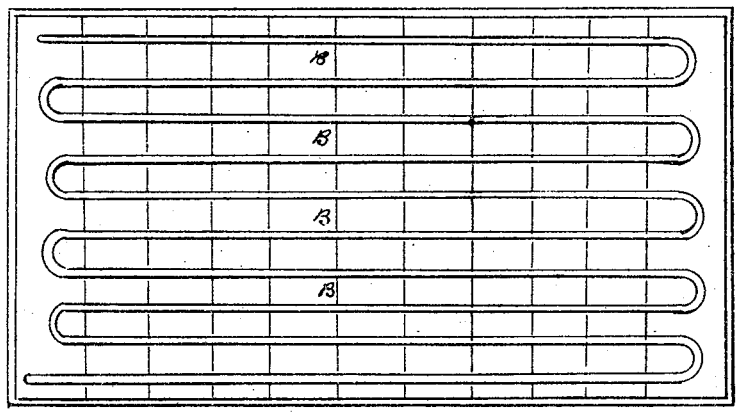
Witnesses
William Hedge
Winslow Warren Jr.
Inventor
Geo. F. Wilson

GEORGE F. WILSON, OF EAST PROVIDENCE, RHODE ISLAND.

Letters Patent No. 75,327, dated March 10, 1868.

IMPROVEMENT IN THE MANUFACTURE OF PHOSPHATES FOR AGRICULTURAL PURPOSES.

*The Schedule referred to in these Letters Patent and making part of the same.*

TO ALL WHOM IT MAY CONCERN:

Be it known that I, GEORGE F. WILSON, of East Providence, in the county of Providence, and State of Rhode Island, have invented a new and improved Method of Manufacturing Superphosphate of Lime for Agricultural Purposes; and I do hereby declare that the following is a full and exact description thereof, reference being had to the accompanying drawings.

The subject of my invention is an improvement in the process of manufacturing superphosphate of lime for agricultural purposes.

Heretofore superphosphate of lime has been manufactured by boiling bones in iron kettles with water, for the purpose of removing their fatty matters, which interfere with the action of acids on the lime of the bones. This boiling, however, cannot be effected without removing the gelatinous matter from the bones, and thereby depriving them of their chief agents for producing ammoniacal compounds, which are of great value for fertilizing purposes.

Another method of reducing bones has been by boiling in wooden vats with water, by the introduction of one or more jets of steam, most of which is condensed during the whole process. This boiling also removes gelatinous matters, thereby depriving the bones of a most valuable fertilizing material.

In order to save and utilize the ammoniacal compounds thus withdrawn, it is necessary to incur much trouble and expense in driving off the water, which is an offensive operation, and is attended with a loss of no inconsiderable part of the ammoniacal matters. When the bones have been reduced by either of the aforesaid processes, so as to be readily acted upon by acids, it is usual to remove them into a receptacle for the purpose of treating them with sulphuric acid, and then ammoniacal products may be restored to the bones from the concentrated gelatine or other source.

In order to attain the result of all these operations by one process, or, in other words, to retain with the bones their ammoniacal constituents without loss or exposure, I have devised a new and improved process of manufacturing superphosphate of lime, and in order to explain the nature and operation of my invention, I hereby give the following description thereof.

I use a wooden vat or vessel, lined with lead, of sufficient size to contain the bones to be treated. I have found it convenient to use a vat which will contain about ten cords of bones. Into this vat I introduce a leaden pipe, which connects with a steam-boiler at one end. The pipe is carried in heated coils on the bottom of said vat, and the opposite end of the pipe is carried up to the top of the vat, so as to discharge no water into the vat except at the will of the operator, it being supplied with two discharge-cocks, as shown in the drawing.

Figure 1 represents the vat in which the acid and bones are treated.

A represents the cock in the steam-pipe through which the steam is introduced into the steam-pipe. B B B, Figure 2, show that part of the steam-pipe which is coiled upon the bottom of the vat. C C' represent two cocks in the pipe, through which the steam comes out of the vat, said pipe opening in two directions—the cock C to allow the steam and condensed water to pass off, the cock C' allowing water to pass off into the vat when required; the vat and the pipe being made of lead, or the former of wood lined with lead.

The mode of operation of this apparatus is as follows: I introduce a quantity of water into the vat, together with oil of vitriol, both in sufficient quantity for the charge of bones intended to be treated. I use an amount of oil of vitriol sufficient to take up by combination therewith all the lime of the bone. I then introduce the charge of bones and turn on steam at about sixty pounds' pressure, which passes into and through the coil at the bottom of the tank, the condensed water being forced out at the end of the pipe. The entire mass soon begins to boil, and is kept at boiling-heat until the bones become soft. The oil of vitriol uniting with the lime, liberates the phosphoric acid, which in turn combines with the ammoniacal matters of the gelatine, forming bone sulphate of lime, acid phosphate of lime, and phosphate of ammonia, which are among the richest ingredients of fertilizers. The combination of the phosphoric acid with the ammoniacal products resulting from boiling the bones prevents the escape of any offensive odor from the operation. This operation is continued until the whole mass in the vat, which may be sixty thousand pounds, more or less, is reduced nearly or quite to dryness, so that the whole mass may be shovelled out like soil. In the case of old and offensive bones, I have sometimes, for their more perfect deodorization, introduced a quantity of finely-powdered bone charcoal.

I claim as my invention, and desire to secure Letters Patent therefor—

This process of reducing bones with acid, substantially as above described, whereby I have made the manufacture of a fertilizer under the name of superphosphate of lime more economical and more valuable than by any other process heretofore known.

GEO. F. WILSON.

Witnesses:
WILLIAM HEDGE,
WINSLOW WARREN, Jr.